(12) United States Patent
Yuan et al.

(10) Patent No.: US 7,392,295 B2
(45) Date of Patent: Jun. 24, 2008

(54) METHOD AND SYSTEM FOR COLLECTING INFORMATION FROM COMPUTER SYSTEMS BASED ON A TRUSTED RELATIONSHIP

(75) Inventors: Chun Yuan, Beijing (CN); Jiahe Helen Wang, Issaquah, WA (US); Yi-Min Wang, Bellevue, WA (US); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 10/918,086

(22) Filed: Aug. 13, 2004

(65) Prior Publication Data

US 2006/0036708 A1    Feb. 16, 2006

Related U.S. Application Data

(60) Provisional application No. 60/547,607, filed on Feb. 24, 2004, provisional application No. 60/545,799, filed on Feb. 19, 2004.

(51) Int. Cl.
*G06F 15/16* (2006.01)

(52) U.S. Cl. .................. 709/217; 709/202; 709/220; 709/227; 709/238

(58) Field of Classification Search ............. 709/202, 709/217, 220, 223, 227, 238, 246, 248
See application file for complete search history.

(56) References Cited

U.S. PATENT DOCUMENTS

| | | | |
|---|---|---|---|
| 6,691,249 B1 | 2/2004 | Barford et al. | |
| 6,738,811 B1 | 5/2004 | Liang | |
| 6,763,482 B2 | 7/2004 | Bernklau-halvor | |
| 6,990,602 B1 | 1/2006 | Skinner et al. | |
| 7,058,861 B1 | 6/2006 | Adams | |
| 7,103,874 B2 * | 9/2006 | McCollum et al. | ......... 717/121 |
| 2002/0124187 A1 | 9/2002 | Lyle et al. | |
| 2003/0050980 A1 * | 3/2003 | Dutta et al. | ............... 709/205 |
| 2003/0204632 A1 | 10/2003 | Willebeek-LeMair et al. | |
| 2004/0260678 A1 | 12/2004 | Verbowski et al. | |
| 2005/0015639 A1 | 1/2005 | Cornelius et al. | |

(Continued)

FOREIGN PATENT DOCUMENTS

GB    2372670    8/2002

(Continued)

OTHER PUBLICATIONS

U.S. Appl. No. 11/762,634, Verbowski et al.

(Continued)

*Primary Examiner*—Michael Won
(74) *Attorney, Agent, or Firm*—Perkins Coie LLP

(57) ABSTRACT

A method and system for retrieving data from devices in a way that seeks to preserve privacy and ensure the integrity of the retrieved data is provided. A retrieval system is implemented on a network of devices that communicate with each other via a secure communications link. Each device is directly connected to one or more "friend" devices that it trusts. The retrieval system operates by forwarding a request for data from one friend device to another friend device. Each friend device may optionally add data to the request until all the requested data is added. The request with the retrieved data is returned to the device that initiated the request.

33 Claims, 8 Drawing Sheets

U.S. PATENT DOCUMENTS

| | | | |
|---|---|---|---|
| 2005/0102370 A1* | 5/2005 | Lin et al. | 709/217 |
| 2005/0155031 A1 | 7/2005 | Wang et al. | |
| 2005/0188268 A1 | 8/2005 | Verbowski et al. | |
| 2005/0198110 A1 | 9/2005 | Garms et al. | |
| 2007/0140479 A1 | 6/2007 | Wang et al. | |
| 2007/0143280 A1 | 6/2007 | Wang et al. | |
| 2007/0168508 A1 | 7/2007 | Wang et al. | |

FOREIGN PATENT DOCUMENTS

| | | |
|---|---|---|
| WO | WO-01/65330 A2 | 9/2001 |
| WO | WO-03/009140 | 1/2003 |

OTHER PUBLICATIONS

"Buffer Overrun In RPC Interface Could Allow Code Execution," Microsoft Security Bulletin MS03-026, Microsoft TechNet, revised Sep. 10, 2003, 8 pages, http://www.micrsoft.com/technet/security/bulletin/MS03-026.mspx?pf=true, [last accessed Jul. 21, 2005].

"Byacc—Berkeley YACC," 1 page, http://dickey.his.com/byacc/byacc.html, [last accessed Jul. 22, 2005].

"Change Auditing Solutions—Tripwire, Inc.," © 2005 Tripwire, Inc., http://www.tripwire.com/, [last accessed Jul. 21, 2005].

"DCE 1.1: Remote Procedure Call," Technical Standard, CAE Specification, © Oct. 1997, Published in the U.K. by The Open Group Oct. 1997, Appendix and Index, pp. 653-716.

"DCE 1.1: Remote Procedure Call," Technical Standard, CAE Specification, © Oct. 1997, Published in the U.K. by The Open Group Oct. 1997, Chapter 11, pp. 481-574.

"DCE 1.1: Remote Procedure Call," Technical Standard, CAE Specification, © Oct. 1997, Published in the U.K. by The Open Group Oct. 1997, Chapter 3, pp. 170-296.

"DCE 1.1: Remote Procedure Call," Technical Standard, CAE Specification, © Oct. 1997, Published in the U.K. by The Open Group Oct. 1997, Chapter 3, pp. 55-169.

"DCE 1.1: Remote Procedure Call," Technical Standard, CAE Specification, © Oct. 1997, Published in the U.K. by The Open Group Oct. 1997, Chapters 12 through 14, pp. 575-652.

"DCE 1.1: Remote Procedure Call," Technical Standard, CAE Specification, © Oct. 1997, Published in the U.K. by The Open Group Oct. 1997, Chapters 4 and 5, pp. 297-356.

"DCE 1.1: Remote Procedure Call," Technical Standard, CAE Specification, © Oct. 1997, Published in the U.K. by The Open Group Oct. 1997, Chapters 6 through 10, pp. 357-480.

"DCE 1.1: Remote Procedure Call," Technical Standard, CAE Specification, © Oct. 1997, Published in the U.K. by The Open Group Oct. 1997, Table of Contents through Chapter 2.

"Flex—a scanner generator—Table of Contents," GNU Project, Free Software Foundation, last updated Nov. 7, 1998, 1 page, http://www.gnu.org/software/flex/manual/, [last accessed Jul. 21, 2005].

"Snort—the de facto standard for intrusion detection/prevention", 1 page, http://www.snort.org/, [last accessed Jul. 22, 2005].

"Unchecked Buffer in Index Server ISAPI Extension Could Enable Web Server Compromise," Microsoft Security Bulletin MS01-033, Microsoft TechNet, updated Nov. 4, 2003, © 2005 Microsoft Corporation, http://www.microsoft.com/technet/security/bulletin/MS01-033.mspx?pf=true, [last accessed Jul. 21, 2005].

"UrlScan Security Tool," Microsoft TechNet, 8 pages, © 2005 Microsoft Corporation, http://www.microsoft.com/technet/security/tools/urlscan.mspx?pf=true [last accessed Jul. 21, 2005].

"Web-to-Host: Reducing the Total Cost of Ownership," The Tolly Group Total Cost of Ownership White Paper, May 2000, 13 pages, © 2000 The Tolly Group.

Agrawal, Rakesh and Ramakrishnan SRIKANT, "Privacy-Preserving Data Mining," In Proceedings of ACM SIGMOD 2000.

Aguilera, Marcos K. et al., "Performance Debugging for Distributed Systems of Black Boxes," SOSP'03, Oct. 19-22, 2003, ACM 2003, 16 pages.

Apap, Frank et al., "Detecting Malicious Software by Monitoring Anomalous Windows Registry Accesses," RAID 2002, Zurich, Switzerland, pp. 1-13.

Bashar, Mohd A. et al., "Low-Threat Security Patches and Tools," Proceedings of International Conference on Software Maintenance, Oct. 1-3, 1997, Bari, Italy, IEEE Computer Society, pp. 306-313, © 1997 by The Institute of Electrical and Electronics Engineers, Inc.

Beattie, Steve et al., "Timing the Application of Security Patches for Optimal Uptime," 2002 LISA XVI, Nov. 3-8, 2002, Philadelphia, PA, pp. 101-110.

Benaloh, Josh Daniel Cohen, "Verifiable Secret-Ballot Elections," Dissertation, Yale University, Dec. 1996, 132 pages.

Burgess, Mark, "A Site Configuration Engine," USENIX Computing Systems, vol. 8, No. 3, 1995, pp. 1-29.

Canny, John, "Collaborative Filtering with Privacy," 2002 IEEE Symposium on Security and Privacy, p. 45.

Chaum, David and Torben Pryds Pedersen, "Wallet Databases with Observers," Advances in Cryptology—CRYPTO'92, LNCS 740, pp. 89-105, 1993, © Springer-Verlag Berlin Heidelberg 1993.

Chaum, David, "Untraceable Electronic Mail, Return Addresses, and Digital Pseudonyms," Communications of the ACM, Feb. 1981, vol. 24, No. 2, © 1981 ACM, 8 pages.

Chen, Mike Y. et al., "Pinpoint: Problem Determination in Large, Dynamic Internet Services," In Proceedings of International Conference on Dependable Systems and Networks 2002, 10 pages.

Chen, Shuo et al., "A Data-Driven Finite State Machine Model for Analyzing Security Vulnerabilities," Proceedings of the 2003 International Conference on Dependable Systems and Networks (DSN'03), © 2003 IEEE, 10 pages.

Chen, Zesheng et al., "Modeling the Spread of Active Worms," IEEE INFOCOM 2003, © 2003 IEEE, 11 pages.

Clarke, Ian et al., "Freenet: A Distributed Anonymous Information Storage and Retrieval System," Lecture Notes in Computer Science, Springer-Verlag GmbH, ISSN: 0302-9743, vol. 2009/2001, Jun. 2003, 21 pages.

Coney, Lillie et al., "Towards a Privacy Measurement Criterion for Voting Systems," Poster paper, National Conference on Digital Government Research, May 2005.

Couch, Alva L. and Michael Gilfix, "It's Elementary Dear Watson: Applying Logic Programming to Convergent System Management Processes," In Proceedings of LISA XIII 1999, Nov. 7-12, 1999, pp. 121-135.

Cramer, Ronald et al., "A Secure and Optimally Efficient Multi-Authority Election Scheme," In Advances in Cryptology—EUROCRYPT'97, vol. 1233 of Lecture Notes in Computer Science, Springer-Verlag, 1997, pp. 103-118.

Cramer, Ronald et al., "Proofs of Partial Knowledge and Simplified Design of Witness Hiding Protocols," Advances in Cryptology—CRYPTO'94, vol. 839 of Lecture Notes in Computer Science, Springer-Verlag, 1994, pp. 174-187.

Douceur, John R., "The Sybil Attack," IPTPS'02 Workshop, Cambridge, MA, Mar. 2002.

Engler, Dawson et al., "Bugs as Deviant Behavior: A General Approach to Inferring Errors in Systems Code," In Proceedings of ACM Symposium on Operating Systems Principles, Oct. 2001, 23 pages.

EP Search Report, Oct. 14, 2005, 4 pages.

Fiat, Amos and Adi Shamir, "How To Prove Yourself: Practical Solutions to Identification and Signature Problems," Advances in Cryptology—CRYPTO'86, LNCS 263, pp. 186-194, 1987, © Springer-Verlag Berlin Heidelberg 1987.

Fielding, R., et al., "Hypertext Transfer Protocol—HTTP/1.1," Jun. 3, 1996, HTTP Working Group, Internet-Draft, 105 pages.

Forrest, Stephanie et al., "A Sense of Self for Unix Processes," in Proceedings of the 1996 Symposium on Security and Privacy, IEEE Computer Society Press, Los Alamitos, CA, pp. 120-128, 1996, © 1996 IEEE.

Freedman, Michael J. et al., "Introducing Tarzan, a Peer-to-Peer Anonymizing Network Layer," IPTPS 2002, 6 pages.

Fujioka, Atsushi, et al., "A Practical Secret Voting Scheme for Large Scale Elections," Advances in Cryptology AUSCRYPT '92, Dec. 13-16, Godl Coast, Queensland, Australia, Dec. 13-16, 1992, © Springer-Verlag Berlin Heidelberg 1993, pp. 244-251.

Ganger, Gregory R. et al., "Finding and containing enemies within the walls with self-securing network interfaces," Technical Report CMU-CS-03-109, Carnegie Mellon University, School of Computer Science, Jan. 2003, 24 pages.

Goldschlag, David et al., "Onion Routing for Anonymous and Private Internet Connections," Jan. 28, 1999, CACM Feb. 1999, 5 pages.

Handley, Mark et al., "Network Intrusion Detection: Evasion, Traffic Normalization, and End-to-End Protocol Semantics," presentation, USENIX Security Symposium 2002, 31 pages.

Hsieh, Hung-Yun and Raghupathy Sivakumar, "A Transport Layer Approach for Achieving Aggregate Bandwidths on Multi-homed Mobile Hosts," MOBICOM'02, Sep. 23-26, 2002, Atlanta, Georgia, © 2002 ACM, 12 pages.

Jakobsson, Markus et al., "Making Mix Nets Robust for Electronic Voting By Randomized Partial Checking," Feb. 1, 2002, USENIX Security'02, pp. 339-353, 2002.

Kamara, Seny et al., "Analysis of Vulnerabilities in Internet Firewalls," Computers & Security, vol. 22, No. 3, Copyright Elsevier 2003, pp. 214-232.

Katz, Jonathan et al., "Cryptographic Counters and Applications to Electronic Voting," EUROCRYPT 2001, LNCS 2045, pp. 78-92, 2001, © Springer-Verlag Berlin Heidelberg 2001.

KaZaa, http://www.kazaa.com, 1 page, [last accessed Jul. 22, 2005].

Keller, Alexander and Christian Ensel, "An Approach for Managing Service Dependencies with XML and the Resource Description Framework," IBM Research Report, RC 22307, Jan. 15, 2002, Computer Science, IBM Research Division, pp. 1-17.

Kissner, Lea and Dawn Song, "Privacy-Preserving Set Operations," Feb. 2005—Last modified Jun. 2005, Carnegie Mellon University, School of Computer Science, CMU-CS-05-113.

Klensin, J., "Simple Mail Transfer Protocol," RFC: 2821, Network Working Group, Standards Track, Apr. 2001, ©The Internet Society 2001, 70 pages.

Kohler, Eddie et al., "Programming language techniques for modular router configurations," Technical Report LCS-TR-812, MIT Laboratory for Computer Science, 2000, pp. 1-22.

Kremenek, Ted and Dawson Engler, "Z-Ranking: Using Statistical Analysis to Counter the Impact of Static Analysis Approximations," Proceedings of the 10th Annual International Static Analysis Symposium, Jun. 2003, 21 pages.

Larsson, Magnus and Ivica Crnkovic, "Configuration Management for Component-based Systems," In Proceedings of International Conference on Software Engineering, May 2001, 5 pages.

Liblit, Ben et al., "Bug Isolation via Remote Program Sampling," PLDI '03, Jun. 9-11, 2003, San Diego, California, © 2003 ACM, pp. 141-154.

Microsoft Security Bulletin MS02-039, "Buffer Overruns in SQL Server 2000 Resolution Service Could Enable Code Execution (Q323875)," Microsoft TechnNet, updated Jan. 31, 2003, 6 pages.

Moore, David et al., "Code-Red: a case study on the spread and victims of an Internet worm," CAIDA, San Diego Supercomputer Center, University of California San Diego, 12 pages, ACM Internet Measurement Workshop 2002.

Moore, David et al., "Inside the Slammer Worm," Slammer Worm Dissection, IEEE Security & Privacy, Published by IEEE Computer Society, © 2003 IEEE, pp. 33-39.

Moore, David et al., "Internet Quarantine: Requirements for Containing Self-Propagating Code," IEEE INFOCOM 2003, © 2003 IEEE, 10 pages.

Noar, Moni, "Bit Commitment Using Pseudo-Randomness," Feb. 25, 2001, IBM Almaden Research Center, Journal of Cryptology, vol. 4, Proceedings of CRYPTO 1989.

Osterlund, Robert, "PIKT: Problem Informant/Killer Tool," Proceedings of the 14th Systems Administration Conference, 2000 LISA XIV, Dec. 3-8, 2000, New Orleans, Louisiana, © 2000 by The USENIX Association, pp. 147-165.

Paxson, Vern, "Bro: A System for Detecting Network Intruders in Real-Time," Computer Networks, 31 (23-24), Dec. 14, 1999, pp. 1-22.

Postel, J. and J. Reynolds, "File Transfer Protocol (FTP)," RFC: 959, Network Working Group, Oct. 1985, pp. 1-69.

Postel, J. and J. Reynolds, "Telnet Protocol Specification," RFC: 854, May 1983, Network Working Group.

Przydatek, Bartosz et al., "SIA: Secure Information Aggregation in Sensor Networks," SenSys '03, Nov. 5-7, 2003, Los Angeles, California, © 2003 ACM, pp. 255-265.

Razmov, Valentin and Daniel R. Simon, "Practical Automated Filter Generation to Explicitly Enforce Implicit Input Assumptions," In Proceedings of the 17th Annual Computer Security Applications Conference, New Orleans, Louisiana, Dec. 2001, 11 pages.

Redstone, Joshua A. et al., "Using Computers to Diagnose Computer Problems," Proceedings of HotOS IX: The 9th Workshop on Hot Topics in Operating Systems, Lihue, Hawaii, May 18-21, 2003, USENIX Association, pp. 91-96.

Reiter, Michael K. and Aviel D. Rubin, "Crowds: Anonymity for Web Transactions," ACM Transactions on Information and System Security, vol. 1, No. 1, Nov. 1998, pp. 66-92, © 1998 ACM.

Rescorla, Eric, "Security holes . . . Who cares?," In Proceedings of USENIX Security Symposium, Aug. 2003, 17 pages.

Ritchey, Ronald W. and Paul Ammann, "Using Model Checking to Analyze Network Vulnerabilities," Security and Privacy 2000, 2000 IEEE Symposium, © 2000 IEEEE, pp. 156-165.

Schulzrinne, H. et al., "RTP: A Transport Protocol for Real-Time Applications," Jan. 1996, Network Working Group, RFC 1889, Standards Track, 75 pages.

Shankar, Umesh, "Active Mapping: Resisting NIDS Evasion Without Altering Traffic," Dec. 2002, Report No. UCB//CSD-2-03-1246, Computer Science Division (EECS), University of California Berkeley, 38 pages.

Shannon, C.E., "A Mathematical Theory of Communication," Reprinted with corrections from The Bell System Technical Journal, vol. 27, pp. 379-423, 623-656, Jul., Oct. 1948.

Sharpe, Richard, "Just what is SMB?" Oct. 8, 2002, 9 pages http://samba.anu.edu.au/cifs/docs/what-is-smb.html [last accessed Jul. 26, 2005].

Silver, Michael A. and Leslie Fiering, "Desktop and Notebook TCO Updated for the 21st Century," Sep. 12, 2003, Gartner Teleconference, http://www.dataquest.com/teleconferences/asset_47431.jsp, [last accessed Jul. 25, 2005].

Singh, Sumeet et al., "The EarlyBird System for Real-Time Detection of Unknown Worms," Technical Report CS2003-0761, University of California at San Diego, 2003, pp. 1-6.

Solomon, David A. and Mark E. Russinovich, "Chapter 5—Management Mechanisms," Inside Microsoft Windows 2000, Third Edition, Microsoft Press, pp. 215-276, © 2000 by David A. Solomon and Mark E. Russinovich.

Staniford, Stuart et al., "How to Own the Internet in Your Spare Time," Proceedings of the 11th USENIX Security Symposium, San Francisco, California, Aug. 5-9, 2002, 20 pages.

Traugott, Steve and Joel Huddleston, "Bootstrapping an Infrastructure," Proceedings of the 12th Systems Administration Conference, LISA XII'98, Dec. 6-11, 1998, Boston, Massachusetts, pp. 181-196, USENIX.

Tripwire, Inc., http://www.tripwire.com/, Accessed Oct. 31, 2005.

Wagner, David, "Resilient Aggregation in Sensor Networks," SASN'04, Oct. 25, 2004, Washington, DC, © 2004 ACM.

Wang, Helen et al., "Friends Troubleshooting Network, Towards Privacy-Preserving, Automatic Troubleshooting," Feb. 2004, IPTPS'04, Springer.

Wang, Helen J. et al., "Automatic Misconfiguration Troubleshooting with PeerPressure," 6th Symposium on Operating Systems Design & Implementation, 2004, USENIX.

Wang, Helen J. et al., "PeerPressure: A Statistical Method for Automatic Misconfiguration Troubleshooting," Nov. 2003, Microsoft Research Technical Report MSR-TR-2003-80, Microsoft Corporation, 13 pages.

Wang, Yi-Min et al., "Persistent-state Checkpoint Comparison for Troubleshooting Configuration Failures," Apr. 4, 2003, Microsoft Technical Report MSR-TR-2003-28, Microsoft Research, Microsoft Corporation, IEEE International Conference on Dependable Systems and Networks, Jun. 2003, © 2003 IEEE.

Wang, Yi-Min et al., "Strider: A Black-Box, State-Based Approach to Change and Configuration Management and Support," Proceedings of the 17th Large Installation Systems Administration Conference, Oct. 26-31, 2003, San Diego, CA, © 2003 by The USENIX Association, pp. 159-171.

Weaver, Nicholas C., "Warhol Worms: The Potential for Very Fast Internet Plagues," Regents of the University of California, 2001, 9 pages, http://www.csua.berkeley.edu/~nweaver/warhol.html, [last accessed Aug. 10, 2007].

Weaver, Nicholas et al., "Large Scale Malicious Code: A Research Agenda," Mar. 2003, 43 pages.

Williamson, Matthew M., "Throttling Viruses: Restricting propagation to defeat malicious mobile code," HPL-2002-172, Jun. 17, 2002, HP Laboratories Bristol, © Hewlett-Packard Company 2002, 7 pages.

* cited by examiner

| conf parameter name | value/ count | | | |
|---|---|---|---|---|
| .jpg/ContentType | image/jpeg 5 | | | |
| .htc/ContentType | null 0 | text/x-comp 5 | | ... |
| url-visited | yahoo 0 | hotmail 1 | nytimes 1 | ... |
| ... | | | | |

METHOD AND SYSTEM FOR COLLECTING INFORMATION FROM COMPUTER SYSTEMS BASED ON A TRUSTED RELATIONSHIP

CROSS-REFERENCE TO RELATED APPLICATION(S)

This application claims the benefit of U.S. Provisional Application No. 60/545,799, filed on Feb. 19, 2004, entitled "FRIENDS TROUBLESHOOTING NETWORK: TOWARDS PRIVACY-PRESERVING, AUTOMATIC TROUBLESHOOTING," and U.S. Provisional Application No. 60/547,607, filed on Feb. 24, 2004, entitled "METHOD AND SYSTEM FOR COLLECTING INFORMATION FROM COMPUTER SYSTEMS BASED ON A TRUSTED RELATIONSHIP," which are hereby incorporated by reference.

TECHNICAL FIELD

The described technology relates generally to retrieving information from peer computer systems.

BACKGROUND

An ever-increasing number of applications (i.e., computer software) with various features are available to users of personal computers. Users can tailor the operation of these applications to suit their needs by specifying various configuration parameters. For example, a browser application may have a configuration parameter that provides a URL of a web page that is displayed initially whenever the browser application starts (i.e., a "home page"). The browser application may also have configuration parameters that identify programs to be invoked to process certain types of content (e.g., a "jpeg" file) and that specify passwords to be used when the application connects to various servers. The values of the configuration parameters can be stored in application-specific configuration files such as UNIX resource files, or they can be stored in a central registry such as the Windows® registry file. The applications access these configuration files to retrieve the values of their configuration parameters.

If certain configuration parameters have incorrect values, then the applications may exhibit an undesired behavior. For example, if the value of a home page configuration parameter is not set correctly, then when the browser application starts, it will exhibit an undesired behavior by not displaying a home page or displaying the wrong home page. If a configuration parameter incorrectly indicates a certain text editor should be invoked to process a graphics file, then the undesired behavior will be the incorrect display of the graphics content. Similarly, if a password configuration parameter has the wrong password, then failure to connect to the server will be the undesired behavior.

Because of the complexity of applications and their large number of configuration parameters, it can be very time-consuming to troubleshoot a problem and determine which configuration parameters are at fault for causing an application to exhibit undesired behavior. Most users of personal computers have difficulty performing this troubleshooting. As a result, users typically rely on technical support personnel to assist in troubleshooting. This technician-assisted troubleshooting not only can be expensive, but users may also experience a significant productivity loss as a result of their inability to effectively use an application that is exhibiting an undesired behavior.

Typically, technical support personnel use an ad-hoc approach to troubleshooting configuration problems. Such personnel generally use knowledge gained from experiencing similar problems and will try to narrow in on the at-fault configuration parameter through a process of elimination. This ad-hoc approach can take a considerable amount of time and can take even longer if the problem is the result of a combination of configuration parameters whose values are incorrect. In some cases, the technical support personnel may compare the values of the configuration parameters to "ideal" values for that application. Because of the large number of configuration parameters available and the large number of possible values for each configuration parameter, many of the configuration parameters will have no "ideal" value. Thus, technical support personnel still need to review those values of the application that are different from the ideal values.

A troubleshooting system for automatically identifying a configuration parameter that is at fault for causing an application to exhibit an undesired behavior is described in U.S. patent application Ser. No. 10/918,786, entitled "METHOD AND SYSTEM FOR TROUBLESHOOTING A MISCONFIGURATION OF A COMPUTER SYSTEM BASED ON CONFIGURATIONS OF OTHER COMPUTER SYSTEMS," filed on Aug. 13, 2004, which is hereby incorporated by reference. That troubleshooting system collects configuration information (e.g., configuration parameter names and their values) from computer systems that may have the same application installed. The troubleshooting system then analyzes the configuration parameters of the application that is exhibiting the undesired behavior and the configuration parameters collected from the other computer systems. Based on this analysis, the troubleshooting system identifies which configuration parameter is likely to be at fault for causing the undesired behavior.

The retrieving of configuration information from other computer systems may raise privacy and integrity issues. The privacy issues may relate to configuration information such as listings of web sites visited, passwords, and so on that a user may not want to divulge. The integrity issues arise when a computer system lies about its configuration information. The lie may be promulgated because the user of the computer system is malicious or because the integrity of the computer system has been compromised, for example, by a virus or worm.

It would be desirable to have a system that would allow for the retrieval of information, such as configuration information, from other computer systems in a way that would preserve the privacy of the information and help ensure the integrity of the retrieved information.

SUMMARY

A method and system for retrieving data from devices in a way that seeks to preserve privacy and ensure the integrity of the retrieved data is provided. A retrieval system is implemented on a network of devices that communicate with each other via a secure communications link. Each device is directly connected to one or more "friend" devices that it trusts. The retrieval system operates by forwarding a request for data from one friend device to another friend device. Each friend device may optionally add data to the request until all the requested data is added. The request is then returned to the device that initiated the request. The retrieval system defines requests that do not include a history of the devices through which a request has traveled; that is, the requests are "historyless." As a result, a device will only know for sure that a particular request traveled through the friend devices from which it received the request and to which it forwarded the request. In addition, because devices may or may not add data to a request, a device that receives a request from a friend device will not know whether the request includes data of the friend device. Because each device selects the next device to which to send a request, the requests do not identify the devices that will add data; that is, the requests are "futureless."

BRIEF DESCRIPTION OF THE DRAWINGS

FIG. 4 is a diagram illustrating a request data structure in one embodiment.

DETAILED DESCRIPTION

Figure 1:
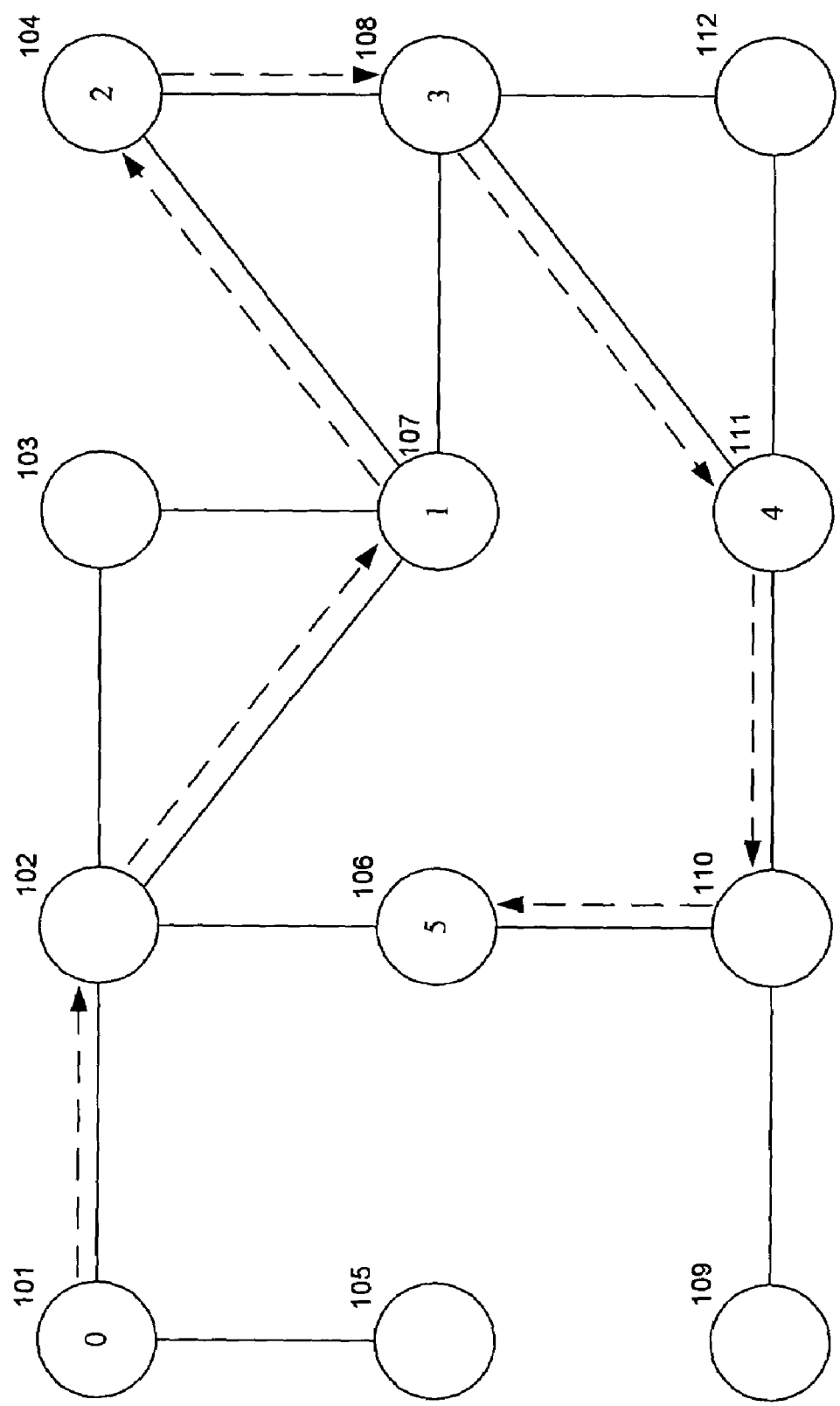
FIG. 1 is a network diagram illustrating the connections between friend devices.

A method and system for retrieving data from devices in a way that seeks to preserve privacy and ensure the integrity of the retrieved data is provided. In one embodiment, a retrieval system is implemented on a network of devices (e.g., computer systems) that communicate with each other via a secure communications link. Each device is directly connected to one or more "friend" devices that it trusts. Friend devices have some relationship that allows each device to trust that the other devices will not intentionally provide incorrect data when requested. For example, the relationship may be that the owners of the devices are social acquaintances, that the users of the devices are within the same department of an organization, that the owners of the devices are in the same profession, and so on. The retrieval system operates by forwarding a request for data from one friend device to another friend device. For example, if device A receives a request for data, it may forward that request to device B, which is its friend. Device B may in turn forward that request to its friend, device C. Devices A and B are friends, and devices B and C are friends. Devices A and C are, however, not necessarily friends. In particular, if device A forwards a request to device C directly, device C may intentionally provide incorrect data in return. In contrast, since devices B and C are friends, device C will not intentionally provide incorrect data when the request is forwarded by device B. The retrieval system defines requests that do not include a history of the devices through which a request has traveled; that is, the requests are "historyless." As a result, a device will only know for sure that a particular request traveled through the friend devices from which it received the request and to which it forwarded the request. Because each device selects the next device to which to send a request, the requests do not identify the devices that will add data; that is, the requests are "futureless." The retrieval system thus relies on a "recursive" trust model in which each device only forwards requests to and receives requests from friend devices. The trust model is not necessarily "transitive" because two devices that each trust a common device may not necessarily trust each other.

In one embodiment, a device that wants to retrieve information from other devices creates a request and forwards it to a friend device. The request describes the data that is to be retrieved. For example, in the case of configuration information, the request may contain the configuration parameter names for which values are to be retrieved from the devices (referred to as sample or helper devices). When a friend device receives the request, it may add its values for those configuration parameters to the request. The friend device then forwards the request to its friend device. The process of forwarding the request from friend device to friend device continues until the requested number of devices has added their data to the request. The device that adds the final data to the request returns the request to the friend device from which it received the request. That friend device returns the request to the friend device from which it received the request and so on until the request is returned to the device that originated the request. Alternatively, a friend device may signal its willingness to add data but defer adding the data to a request until the request is returned to it on its way back to the device that originated the request. In this way, each friend device will only have access to data added by those who have already returned the request, rather than to all the data that is eventually added to the request.

To protect the anonymity of a particular device that adds data to the request, only data that does not reveal the identity of a device is included in a request. For example, a configuration parameter for a user name would not be included in a request. Furthermore, a friend device may selectively decide whether to add its data to a request, but it will not intentionally give incorrect data. The friend device may use a probability distribution to control whether it should add its data to the request. For example, a device may only want to add its data to 10% of randomly selected requests. This selective adding of data to requests helps ensure that a "friend" device that is malicious cannot ascertain the configuration parameters of that device by sending requests to the device indicating that data from only one more device is needed. In addition, the probability may be decreased when the remaining count is low to help prevent a malicious device from inferring the data of another device by repeatedly sending requests with a small remaining count. By decreasing the probability, the data returned to the malicious device will have a low probability of including data of that device. Each device may also randomly select one of its friend devices to which it will forward a request, which results in a random walk through the devices. In addition, a device may delay in returning or forwarding a request to make it difficult for a malicious "friend" device to use the timing information to determine whether that device added data to the request. For example, the delay may be randomly selected from the delay inherent in the processing of the request by 5 to 15 devices so that from the timing it cannot be inferred whether 1 or 15 devices processed the request.

FIG. 1 is a network diagram illustrating the connections between friend devices. Devices 101-112 are connected to their friend devices via communications links illustrated by the solid lines. For example, device 101 is connected to friend devices 102 and 105. Device 101 is, however, not a friend of devices 103-104 and 106-112. The dashed lines indicate the path a request travels as it is forwarded from friend device to friend device. In this example, a request originates at device 101 and specifies to retrieve data from five devices (referred to as the sample count). Device 101 initially forwards the request to device 102, which may have been randomly selected from devices 102 and 105. Upon receiving the request, device 102 decides that it will not add its data to the request; that is, it is not a sample device or a helper, but rather it is simply a forwarder. Device 102 may not have the requested data or its probability distribution indicates that it should not add data to the request. Device 102 forwards the request to device 107, which may have been randomly selected from among devices 103, 106, and 107. Upon receiving the request, device 107 adds its data to the request and forwards the request to device 104, which may have been randomly selected from among devices 103, 104, and 108. Upon receiving the request, device 104 adds its data to the request and forwards it to device 108. Device 108 adds its data to the request and initially attempts to forward to device 107, which may have been randomly selected from among devices 107, 111, and 112. Upon receiving the request, device 107 notes that it already has received that request and responds to device 108 that it cannot handle the request. Upon receiving the response, device 108 forwards the request to device 111, which may be randomly selected from among devices 111 and 112. Upon receiving the request, device 111 adds its data to the request and forwards it to device 110, which may be randomly selected from among devices 110 and 112. Upon receiving the request, device 110 may decide not to add its data to the request, for example, because it is too busy performing some other task, and forwards the request to device 106, which may be randomly selected from among devices 106 and 109. Device 106, upon receiving the request, adds its data to the request and then detects that all the requested data has been added because a remaining sample count has been decremented to zero. Device 106 then returns the request to device 110, which returns the request to device 111, and so on until the request is returned to device 101, which originated the request.

Referring again to FIG. 1, if device 107 had initially forwarded the request to device 103 rather than device 104, device 103 would have no friend device to which to forward the request. In such case, device 103 would return the request to device 107. Device 107 would recognize that the request does not have all the requested data (e.g., remaining count greater than zero) and would forward the request to one of its other friend devices or return the request to device 102 so that it could forward the request to one of its other friend devices, such as device 106. In this way, a request can travel around the network from friend device to friend device and when a device has no friend device to which to forward the request, the request is returned to the friend device from which it was received. A friend device that does not want to process a request, for example, because it is too busy, can simply respond to a request with a negative acknowledgement. The device receiving the negative acknowledgement can send the request to another friend device or return the request.

Figure 2:
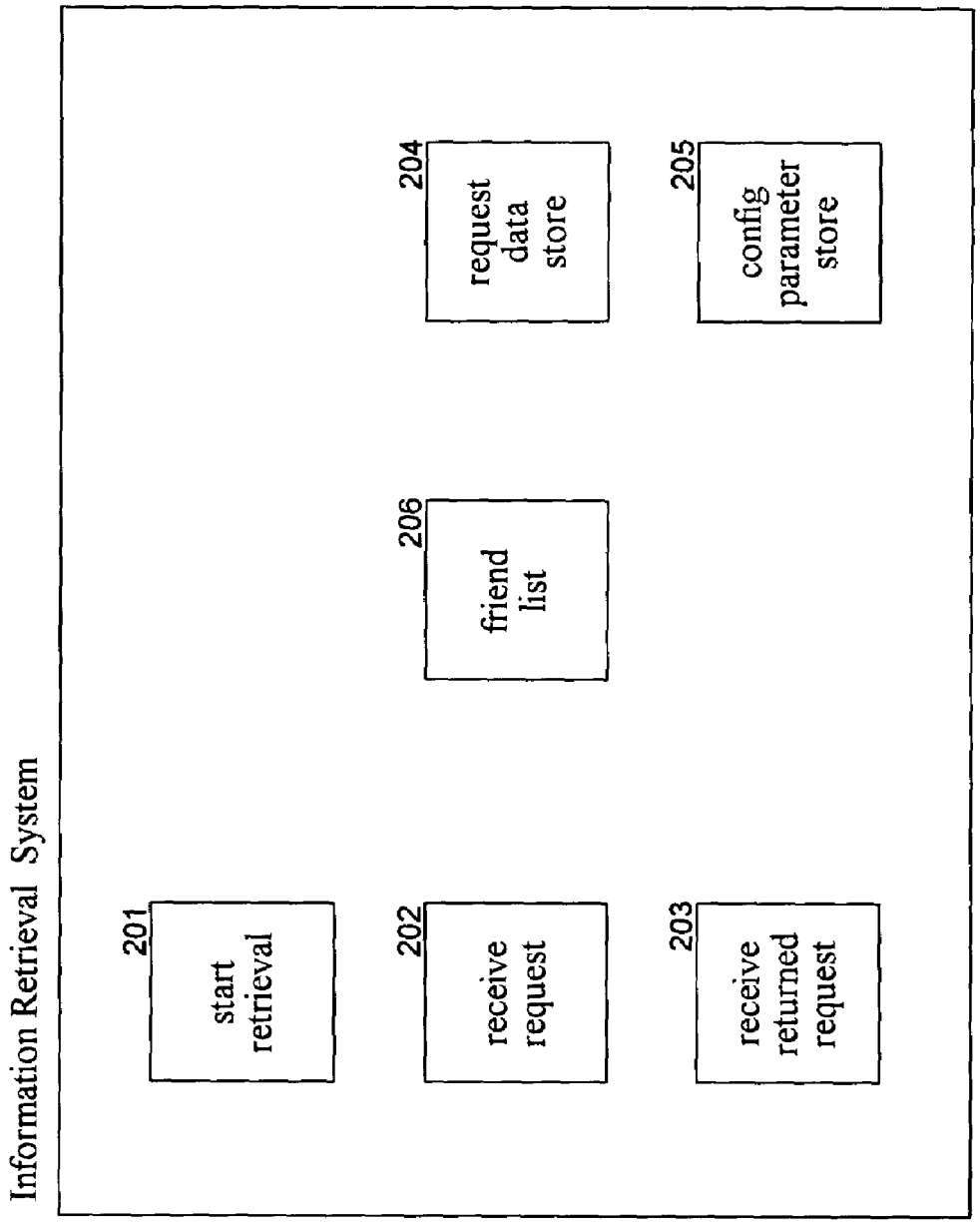
FIG. 2 is a block diagram illustrating components of the information retrieval system in one embodiment.

FIG. 2 is a block diagram illustrating components of the information retrieval system in one embodiment. In one embodiment, each device that participates in the information retrieval includes a start retrieval component 201, a receive request component 202, and a receive returned request component 203. Each device also includes a request data store 204, a configuration parameter store 205, and a friend list 206. The start retrieval component is used to originate a request to retrieve data from other devices. In this example, the data to be retrieved is configuration parameter data. The start retrieval component may randomly select a friend device from the friend list and forward the request to that friend device. The request may include a list of configuration parameters that are to be retrieved and a remaining count of the number of devices from which the data is to be retrieved. The receive request component receives requests from friend devices, adds data to the requests as appropriate, and forwards the requests to friend devices that may be randomly selected from the friend list. The receive returned request component receives requests that are returned from a friend device and returns those requests to the sending friend device. The request data store contains information describing each request that has been forwarded from this device to another device. The information may include for each request, the request itself, the previous device (i.e., the device from whom the request was received), and the next device (i.e., the device to whom the request was forwarded). The configuration parameter store contains the configuration information of the device. One skilled in the art will appreciate that certain devices may not have a need to originate requests and thus would not need the start retrieval component.

The computing devices on which the retrieval system may be implemented include a central processing unit, memory, input devices (e.g., keyboard and pointing devices), output devices (e.g., display devices), and storage devices (e.g., disk drives). The memory and storage devices are computer-readable media that may contain instructions that implement the retrieval system. In addition, data structures and message structures may be stored or transmitted via a data transmission medium, such as a signal on a communications link. Various communications links may be used, such as the Internet, a local area network, a wide area network, or a point-to-point dial-up connection.

The retrieval system may be implemented using various computing systems, environments, and configurations, such as personal computers, server computers, hand-held or laptop devices, multiprocessor systems, microprocessor-based systems, programmable consumer electronics, network PCs, minicomputers, mainframe computers, routers, switches, distributed computing environments that include any of the above systems or devices, and the like.

The retrieval system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The term "application" refers to any type of executing software such as drivers, kernel-mode code, operating systems, system utilities, web servers, database servers, and so on.

Figure 3:
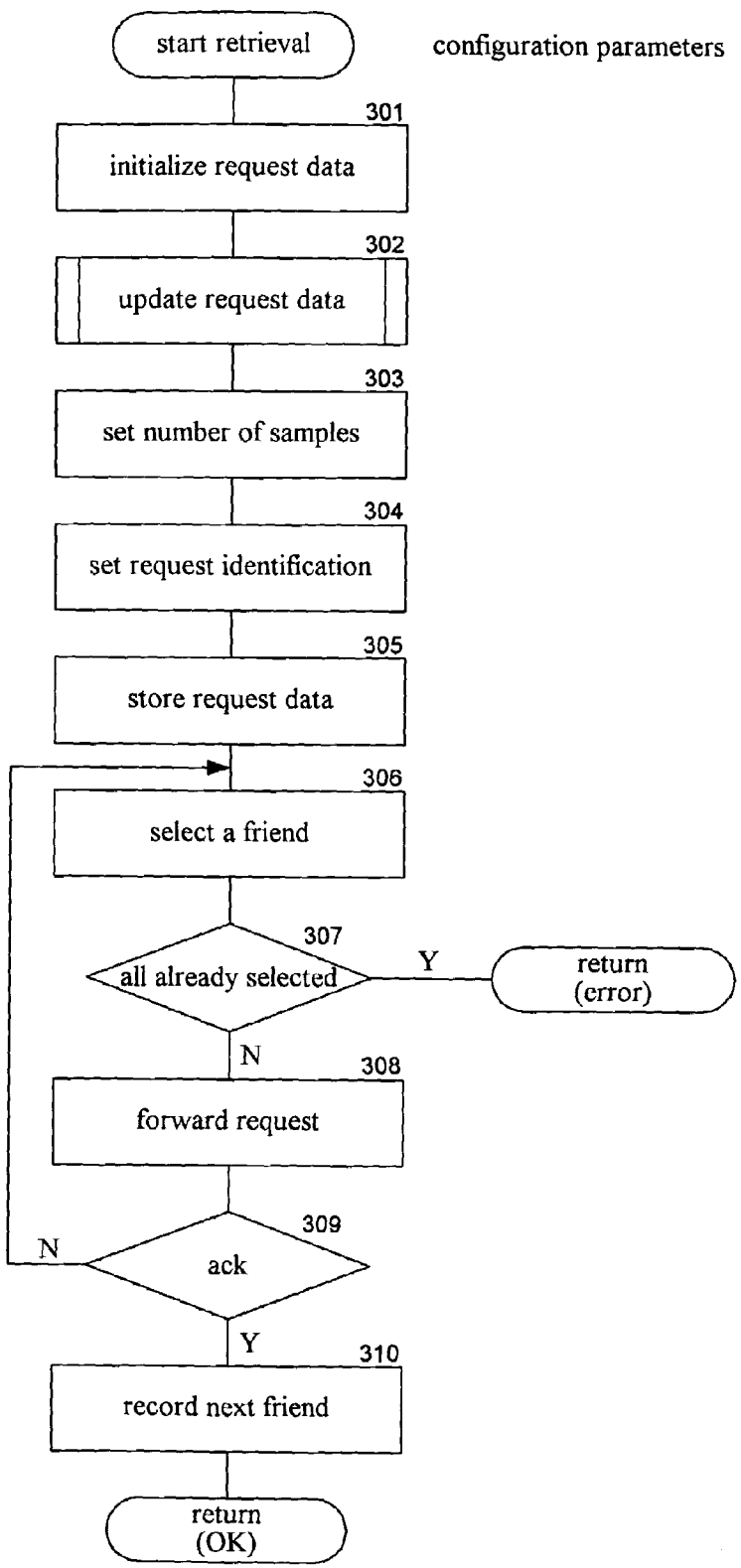
FIG. 3 is a flow diagram illustrating the processing of the start retrieval component in one embodiment.

FIG. 3 is a flow diagram that illustrates the processing of the start retrieval component in one embodiment. The start retrieval component may be passed the names of the configuration parameters that are to be retrieved from the other devices. In block 301, the component initializes the request with the names of the configuration parameters. In block 302, the component invokes an update request data component to optionally add the values of the configuration parameters to the request. In block 303, the component sets the remaining count of devices from which the data is to be retrieved, which initially is the total count of devices from which the data is to be retrieved. The remaining count of devices is decremented by each device that adds its data to the request. In block 304, the component stores a request identifier in the request. The request identifier may be generated by a one-way function that combines a nonce and some combination of the configuration parameter names. In block 305, the component stores the request. In blocks 306-309, the component loops, selecting a friend device and forwarding the request to the friend device until a friend device acknowledges that it can process the request. In block 306, the component randomly selects a friend device. In decision blocked 307, if all the friend devices have already been selected, then no available friend device has been found and the component returns an error indication, else the component continues at block 308. In block 308, the component forwards the request to the selected friend device. In decision block 309, if an acknowledgment is received from the friend device, then the component continues at block 310, else the component loops to block 306 to select a next friend device. In block 310, the component records the selected friend device as the next friend device to which the request was forwarded and then returns an indication of OK.

TABLE 1

| Name | Original | Sample1 | Sample2 | Sample3 | Sample4 | Sample5 |
| --- | --- | --- | --- | --- | --- | --- |
| .jpg/contentType | image/jpeg | image/jpeg | image/jpeg | image/jpeg | image/jpeg | image/jpeg |
| .htc/contentType | null | text/x-comp | Text/x-comp | Text/x-comp | text/x-comp | text/x-comp |
| url-visited | yahoo | hotmail | Nytimes | SFGate | google | friendster |

Table 1 illustrates values for various configuration parameters that have been collected. In this example, data for three configuration parameters (e.g., ".jpg/contentType") are being retrieved. The retrieval system retrieved sample values from five sample computer systems for each configuration parameter. Each sample computer system may have simply incremented a count for values already added to the request. For example, a count of 5 may be associated with the value of "image/jpeg" for the first parameter because all five samples have the same value.

FIG. 4 is a diagram illustrating a request data structure in one embodiment. In this example, the request data structure includes a row 401-403 for each configuration parameter. Each row contains the name of the configuration parameter and a column for each unique value of that configuration parameter of the helpers who added data to the request. In this example, the first value column indicates the values of the originating device and a count of each sample device or helper that had that same value. In an alternate embodiment, the originating device may not include its values in a request or it may include a randomly generated set of values for the configuration parameters so that the next device cannot ascertain the values of the originating device. Any device could add a random set of values to the request so long as it subtracts those values when the request is returned. As new values for a configuration parameter are encountered on sample devices, new columns may be added to the data structure. If a column for a value already exists, then its count is incremented by each sample device that has that value. One skilled in the art will appreciate that this data structure represents a logical organization of the information that is retrieved and may be physically organized using variable length arrays, linked lists, pointers, and other data types.

Figure 5:
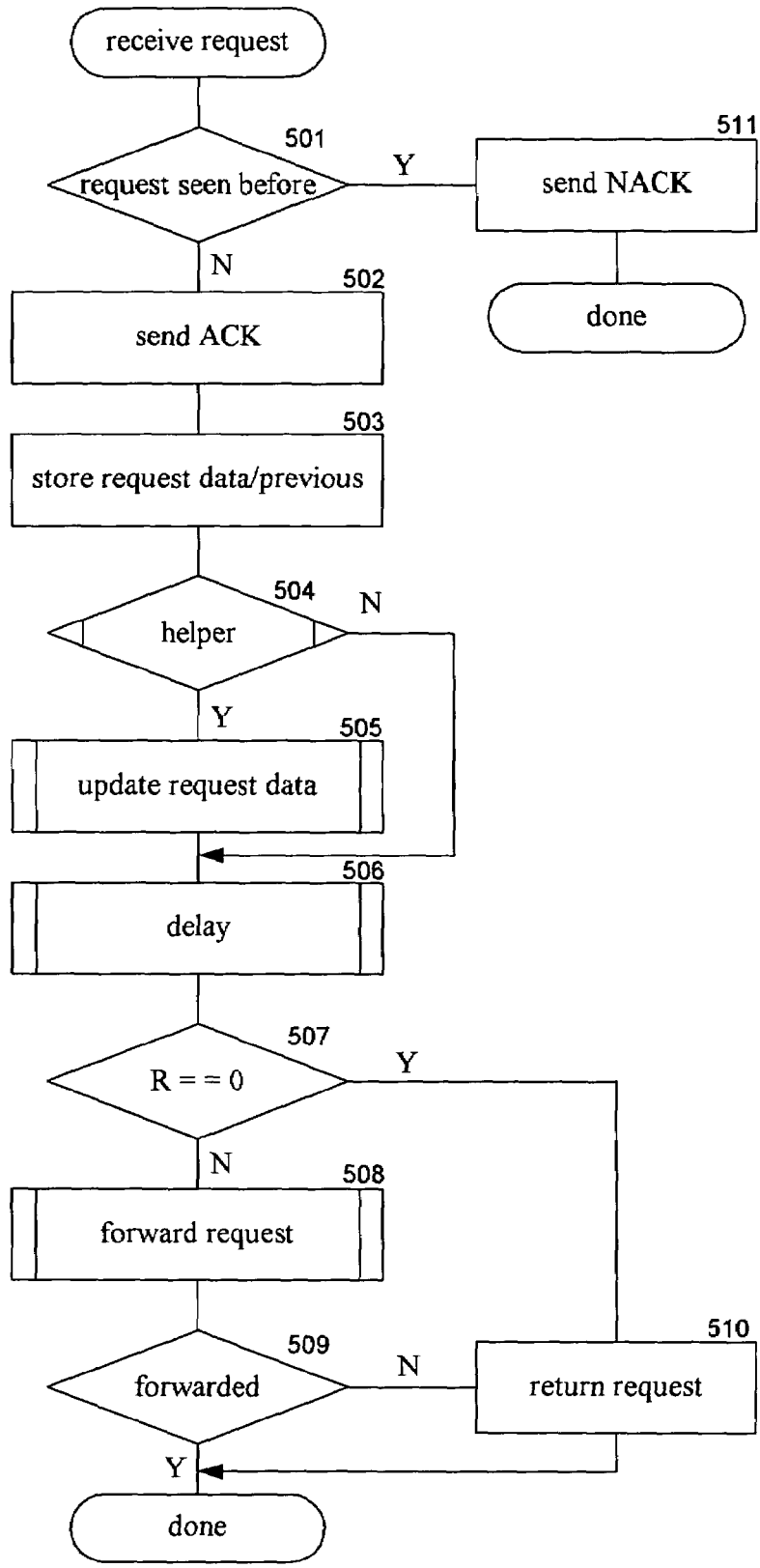
FIG. 5 is a flow diagram illustrating the processing of the receive request component in one embodiment.

FIG. 5 is a flow diagram that illustrates the processing of the receive request component in one embodiment. This component receives a request from a friend device, selectively adds its data to the request, and forwards the request to a friend device as appropriate. In decision block 501, if a request with the same request identifier has been encountered before by this device, then the component sends a negative acknowledgment in block 511 and then completes (to prevent loops), else the component continues at block 502. The component may also send a negative acknowledgment if it is too busy or for some other reason does not want to handle the request. In block 502, the component sends an acknowledgment. In block 503, the component stores the request data and an indication of the previous device in the request data store. This information is used when returning a request to the previous device. The device may use the request data to ensure that the request that is returned is consistent with the stored request data. For example, the device may ensure that the count of the configuration parameter values in the returned request is consistent with the remaining count of devices. The device may also check that additional configuration parameter names have not been added or removed. This checking helps ensure that a malicious device did not intentionally add incorrect data. In decision block 504, if this device is to be a helper, then the component continues at block 505, else the component continues at block 506. This device may be a helper device based on a probability distribution and based on whether this device actually has the requested data. In block 505, the component invokes the update request component to add the requested data to the request. In block 506, the component delays an amount of time. This delay may be based on the remaining count of devices. That is, the delay may be longer when the remaining device count is smaller. One skilled in the art will also appreciate that a delay may also be introduced when handling a returned request. In decision block 507, if the remaining count is zero, then this is the last device to add its data to the request and the component continues at block 510, else the component continues at block 508. In block 508, the component invokes the forward request component to forward the request to a friend device. In decision block 509, if the request was successfully forwarded, the component completes, else the component continues at block 510. In block 510, the component returns the request to the previous device and then completes.

Figure 6:
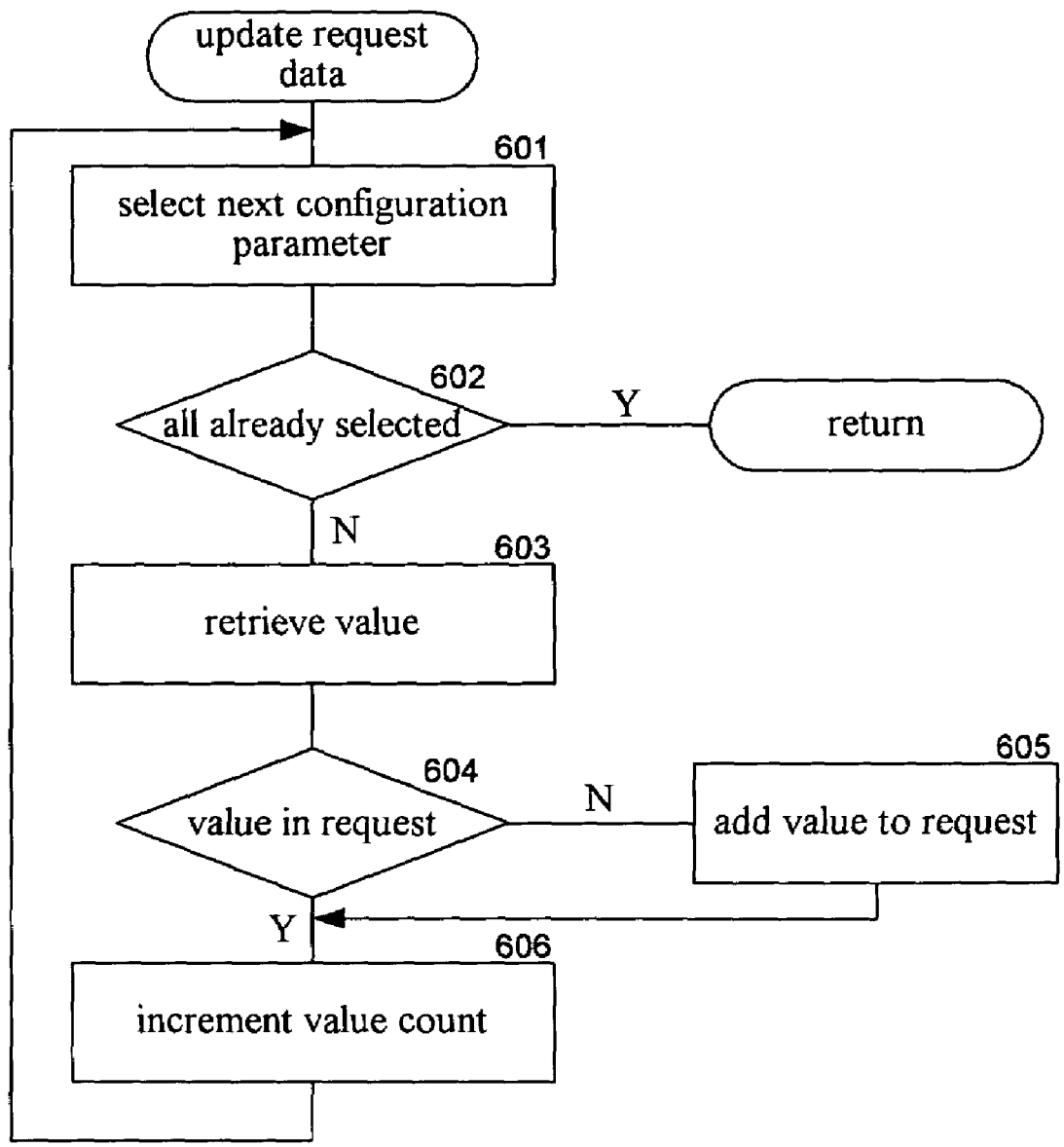
FIG. 6 is a flow diagram illustrating the processing of the update request data component in one embodiment.

FIG. 6 is a flow diagram that illustrates the processing of the update request data component in one embodiment. This component is passed a request and updates the request data structure based on the values of the configuration parameters of this device. In block 601, the component selects the next configuration parameter of the request. In decision block 602, if all the configuration parameters of the request have already been selected, then the component returns, else the component continues at block 603. In block 603, the component retrieves the value for the selected configuration parameter. In decision block 604, if the value for the selected configuration parameter is already in the data structure, then the component continues at block 606, else the component continues at block 605. In block 605, the component adds the value to the request with a count of zero and then continues at block 606. In block 606, the component increments the value count and then loops to block 601 to select the next configuration parameter of the request.

Figure 7:
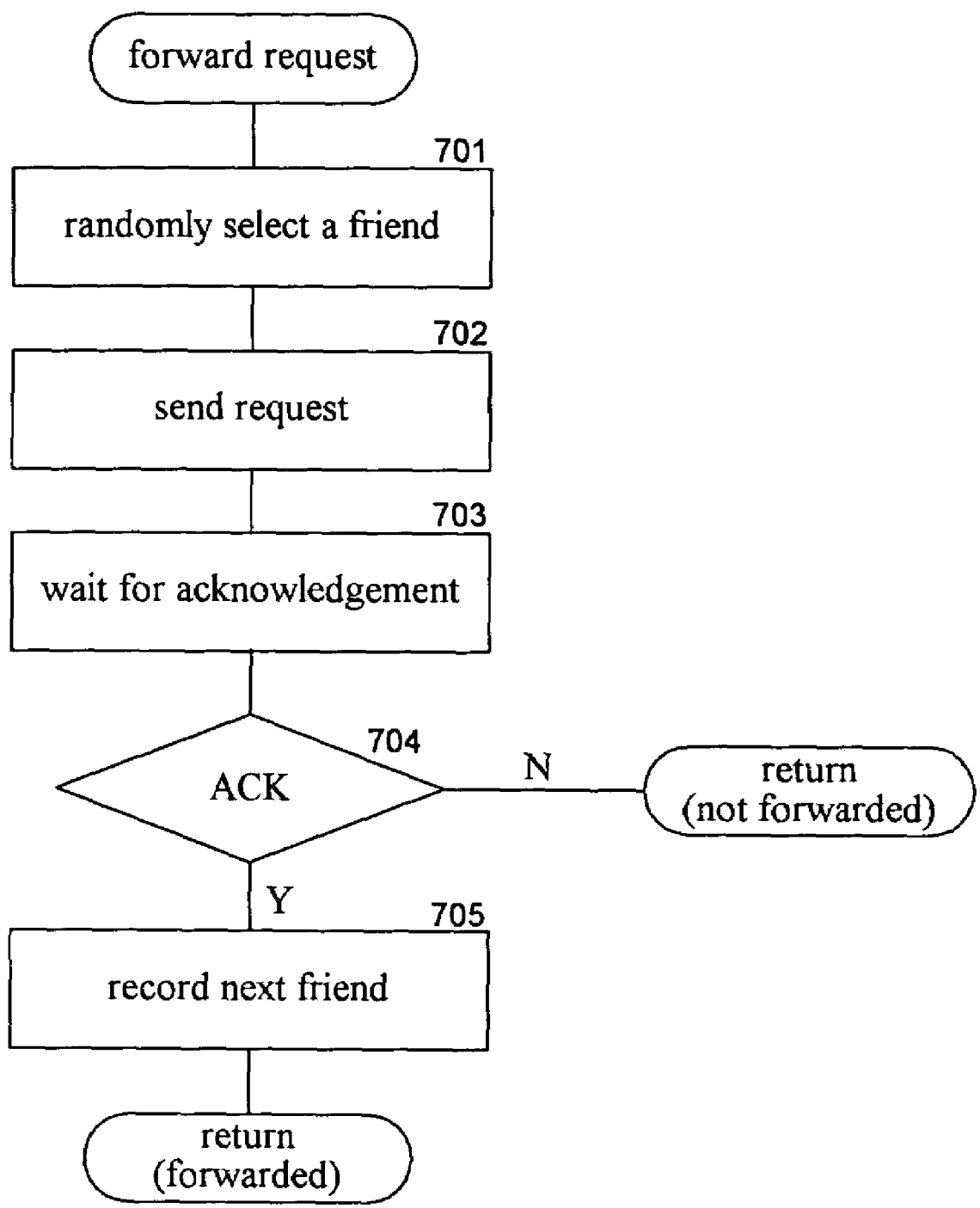
FIG. 7 is a flow diagram illustrating the processing of the forward request component in one embodiment.

FIG. 7 is a flow diagram that illustrates the processing of the forward request component in one embodiment. This component is passed a request and forwards the request to a randomly selected friend device. In block 701, the component randomly selects a friend device. In block 702, the component forwards the request to the selected friend device. In block 703, the component waits for an acknowledgment from the friend device. In decision block 704, if the request is acknowledged, then the component continues at block 705, else the component returns an indication that the request was not forwarded. In block 705, the component records the selected friend device as the next friend device in the request data store and then returns an indication that the request was forwarded.

Figure 8:
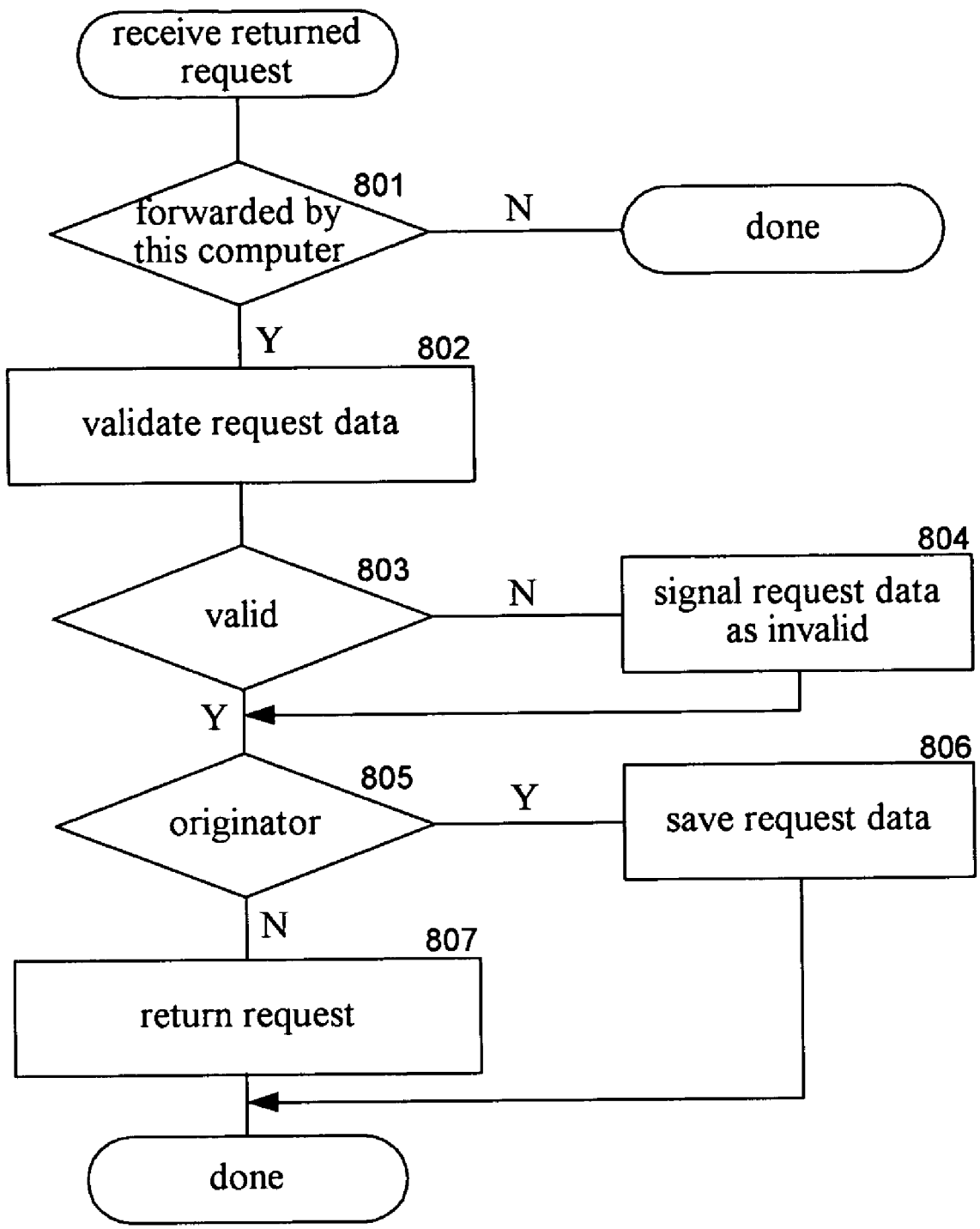
FIG. 8 is a flow diagram illustrating the processing of the receive returned request component in one embodiment.

FIG. 8 is a flow diagram that illustrates the processing of the receive returned request component in one embodiment. This component is passed a request that has been returned from a friend device. In decision block 801, if this device forwarded the request to the friend device from which the request is being returned, then the component continues at block 802, else something is wrong with the returned request (e.g., a "friend" device is acting maliciously) so the device ignores it and the component completes. In block 802, the component validates the data of the request. This validation may include checking to ensure that the configuration parameters of the request are consistent with the configuration parameters of the request that were initially forwarded and that the counts of values are consistent with the remaining count. In decision block 803, if the data of the request is valid, the component continues at block 805, else the component continues at block 804. In block 804, the component updates the request data to indicate that it is invalid. In decision block 805, if this device is the originator of the request, then the component continues at block 806, else the component continues at block 807. In block 806, the component saves the data of the request for further processing (e.g., by the troubleshooting system) and then completes. In block 807, the component returns the request to the previous device as indicated by the request data store and then completes.

One skilled in the art will appreciate that although specific embodiments of the retrieval system have been described herein for purposes of illustration, various modifications may be made without deviating from the spirit and scope of the invention. For example, a device may split a request and send the split request (with a portion of the remaining count) to multiple friend devices. When the requests are returned, the device can combine them into a single request to be returned. This splitting introduces parallelism into the retrieval. In order to prevent two devices from colluding against a common friend, a device may add random noise to a request, which can be filtered out by the originator. Although this may only provide a statistical approximation of the retrieved data, it may be sufficient for the originator but insufficient for the colluder to infer the data of their common "friend."

A Sybil-type attack may occur when a malicious "friend" device simply updates the data of the request to look like the remaining count of devices added their data and returns it or forwards the request to a device with which it is conspiring. In either case, the returned data is likely to be incorrect. To counteract the effects of a Sybil attack, the retrieval system may send a request to multiple friend devices in hopes that most of them will return correct data. When each friend device returns the data that is collected, the retrieval system can analyze the data and select data that is represented by the majority of the returned requests. Each device may also have a confidence factor associated with each "friend" device indicating the degree of confidence in the friendship. The retrieval system may factor in these confidence factors, which may be added to the returned data by each device, in determining which returned request is likely to have the most correct data.

The data of a request may be encrypted to help ensure the privacy of the information. For example, the originating device may include a public key of a private/public key pair in the request. Each device that adds data to the request may encrypt its data with the public key. The originating device can use its private key to decrypt the data. With such encryption, only the originating device will have access to the unencrypted data. The retrieval system may be used to collect any type of data from friend devices. Accordingly, the invention is not limited except by the appended claims.

We claim:

1. A method for retrieving data from devices, at each device the method comprising:
   receiving from a previous device a request for data;
   when this device is to provide the requested data,
     updating the request with requested data;
     when the request includes all the requested data, returning to the previous device the updated request;
     when the request does not include all the requested data, forwarding to a next device the updated request; and
   when this device is not to provide requested data, forwarding to a next device the request; and
   when a request is returned from the next device, returning to the previous device the returned request;
   wherein the data is configuration parameter data and wherein the device is to provide requested data based on a probability distribution.

2. The method of claim 1 including starting retrieval of data by sending a request to a next device and when the request is returned from the next device, detecting that the retrieval started at this device.

3. The method of claim 1 wherein this device is not to provide requested data when it does not have the requested data.

4. The method of claim 1 wherein this device delays in returning a request to prevent the previous device from ascertaining whether this device provided the requested data.

5. The method of claim 4 wherein the delay is based on how many more devices need to provide requested data.

6. The method of claim 1 wherein the request includes a count of how many devices are to provide the requested data.

7. The method of claim 1 wherein the request includes a unique identifier.

8. The method of claim 1 wherein the request includes the identity of only the previous device.

9. The method of claim 1 wherein a device that starts the retrieval adds data to the requested data to make it difficult for another device to ascertain which device started the retrieval.

10. The method of claim 1 wherein the requested data is value of parameters, and the updating of the request includes for each parameter incrementing a count corresponding to the value of this device for the parameter.

11. The method of claim 10 wherein the parameters are configuration parameters.

12. The method of claim 1 wherein a device randomly selects the next device to forward the request.

13. The method of claim 1 wherein each device forwards a request to only trusted devices.

14. The method of claim 13 wherein the trust relationship is recursive.

15. The method of claim 1 wherein the request is forwarded over a secure communication path to the next device.

16. The method of claim 1 wherein if a request has previously been received by this device, then this device responds to the sender device that it is not providing the requested data.

17. The method of claim 1 wherein the request is historyless and futureless.

18. A network of devices that provide requested data, comprising:
   a plurality of devices that each receives from previous devices requests for requested data, selectively updates the request with the requested data, forwards the request to a next device, receives the returned request from the next device, and returns the received returned request to the previous device; and a communications link connecting each device to a previous device and a next device;

wherein the requested data is configuration parameter data and wherein the device is to provide selective updating based on a probability distribution.

19. The network of claim 18 wherein a request only identifies the device forwarding or returning the request.

20. The network of claim 18 wherein each device forwards requests only to devices that it trusts.

21. The network of claim 20 wherein the trust relationship is recursive.

22. The network of claim 18 wherein a device selectively delays forwarding requests to help prevent another device from detecting whether that device updated the request.

23. The network of claim 18 wherein each device selects the next device.

24. The network of claim 23 wherein a device randomly selects the next device.

25. A computer-readable storage medium containing instructions for controlling a device to participate in retrieval of data, by a method comprising:

determining whether data is to be provided to a request for data;

when it is determined that data is to be provided, adding data to the request;

selectively forwarding the request for data to a next device to provide additional data; and returning to a previous device the request with added data;

wherein the data is configuration parameter data and wherein the device is to provide requested data based on a probability distribution.

26. The computer-readable storage medium of claim 25 wherein the request is forwarded when not all requested data has been provided.

27. The computer-readable storage medium of claim 25 wherein the request is not forwarded when all the requested data has been provided.

28. The computer-readable storage medium of claim 25 including randomly selecting a next device.

29. The computer-readable storage medium of claim 25 wherein the returning occurs when the request is returned from the next device.

30. The computer-readable storage medium of claim 25 wherein the returning occurs when the adding of the data to the request results in all requested data being provided.

31. The computer-readable storage medium of claim 25 wherein the forwarding includes delaying the forwarding so that it appears the request may have been forwarded by the device to other devices before forwarding to the next device.

32. The computer-readable storage medium of claim 25 wherein the returning includes delaying the returning so that it appears the request may have been forwarded by the device to other devices before returning to the previous device.

33. The computer-readable storage medium of claim 25 wherein the probability decreases as the data previously added to the request nears all the requested data.

* * * * *